US012244618B2

(12) United States Patent
Wittel et al.

(10) Patent No.: US 12,244,618 B2
(45) Date of Patent: *Mar. 4, 2025

(54) SYSTEMS AND METHODS FOR PRIORITIZING URL REVIEW FOR SANDBOXING BASED ON ACCELERATED VELOCITIES OF URL FEATURES IN NETWORK TRAFFIC

(71) Applicant: Proofpoint, Inc., Sunnyvale, CA (US)

(72) Inventors: Gregory Lee Wittel, Mountain View, CA (US); Edward Pavlov, San Jose, CA (US)

(73) Assignee: PROOFPOINT, INC., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/393,335

(22) Filed: Dec. 21, 2023

(65) Prior Publication Data
US 2024/0171598 A1    May 23, 2024

Related U.S. Application Data

(63) Continuation of application No. 17/214,627, filed on Mar. 26, 2021, now Pat. No. 11,882,131.

(60) Provisional application No. 63/133,122, filed on Dec. 31, 2020.

(51) Int. Cl.
*H04L 9/40* (2022.01)

(52) U.S. Cl.
CPC ...... *H04L 63/1416* (2013.01); *H04L 63/1441* (2013.01)

(58) Field of Classification Search
CPC .................. H04L 63/1416; H04L 63/1441
See application file for complete search history.

(56) References Cited

U.S. PATENT DOCUMENTS

| 7,716,297 | B1* | 5/2010 | Wittel | H04L 51/212 |
| | | | | 709/206 |
| 8,201,254 | B1* | 6/2012 | Wilhelm | H04L 63/1416 |
| | | | | 709/224 |
| 8,521,667 | B2* | 8/2013 | Zhu | H04L 63/1408 |
| | | | | 706/13 |
| 8,850,571 | B2* | 9/2014 | Staniford | G06F 9/45533 |
| | | | | 713/188 |

(Continued)

*Primary Examiner* — Kambiz Zand
*Assistant Examiner* — Afaq Ali
(74) *Attorney, Agent, or Firm* — Sprinkle IP Law Group

(57) ABSTRACT

A URL velocity monitor is integrated with a message-hold decision maker of an electronic mail processing system that processes electronic messages for a protected computer network. The URL velocity monitor receives or obtains a URL, decomposes the URL into URL features based on logical boundaries, and determines features of interest from the URL features for velocity tracking. Examples of URL features can include a randomized URL segment. The velocity of each feature of interest is tracked over a period of time using a counting algorithm that employs a slow counter or a fast counter. The two different counters track two types of velocities which represent different domain behaviors targeting the protected computer network. The URL velocity monitor determines whether the velocity of a feature of interest is accelerating within the time period. If so, the URL is placed in a queue or a sandbox.

17 Claims, 5 Drawing Sheets

(56) References Cited

U.S. PATENT DOCUMENTS

| | | | |
|---|---|---|---|
| 11,671,448 B2* | 6/2023 | Nunes | G06N 3/044 |
| | | | 726/1 |
| 2013/0159826 A1* | 6/2013 | Mason | G06F 16/954 |
| | | | 715/205 |
| 2015/0237068 A1* | 8/2015 | Sandke | H04L 63/1425 |
| | | | 726/23 |
| 2021/0042442 A1* | 2/2021 | Al-Kabra | H04L 67/10 |

* cited by examiner

SYSTEMS AND METHODS FOR PRIORITIZING URL REVIEW FOR SANDBOXING BASED ON ACCELERATED VELOCITIES OF URL FEATURES IN NETWORK TRAFFIC

CROSS-REFERENCE TO RELATED APPLICATIONS

This application is a continuation of, and claims a benefit of priority under 35 U.S.C. § 120 from, U.S. patent application Ser. No. 17/214,627, filed Mar. 26, 2021, issued as U.S. Pat. No. 11,882,131, entitled "SYSTEMS AND METHODS FOR PRIORITIZING URL REVIEW FOR SANDBOXING BASED ON ACCELERATED VELOCITIES OF URL FEATURES IN NETWORK TRAFFIC," which claims a benefit of priority under 35 U.S.C. § 119 (e) from U.S. Provisional Application No. 63/133,122, filed Dec. 31, 2020, entitled "SYSTEMS AND METHODS FOR PRIORITIZING URL REVIEW FOR SANDBOXING BASED ON ACCELERATED VELOCITIES OF URL FEATURES IN NETWORK TRAFFIC," both of which are fully incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to electronic message processing and threat protection. More particularly, this invention relates to systems, methods, and computer program products for prioritizing reviews of Universal Resource Locators (URLs) for sandboxing as part of message hold based on accelerated velocities of URL features, useful for protecting computer networks from malicious attacks through email campaigns originated from suspicious domains.

BACKGROUND OF THE RELATED ART

Today, hundreds of millions of domains can be found on the Internet and millions more are added each year. Each domain can have any number of URLs. The massive number of URLs, including those that are unknown to a domain monitoring system, makes monitoring them in a timely and effective manner an extremely difficult technical challenge.

This challenge is made even more difficult due to the lack of uniformity in URLs. A URL can be arbitrarily structured to form a web address of a network resource, such as a web page, a file, or a reference to a more complicated object, such as a query to a database or to a search engine, etc.

This web address contains a domain name and other information, for instance, a transfer protocol, a path, etc. Because a URL can lead to any resource on the World Wide Web, there is not a one-size-fits-all solution to URL monitoring.

For instance, a web site publishes an article about a celebrity at a new URL and can see traffic to the new URL leading to the article is accelerating fast in terms of frequency and number of visits. However, the same network traffic pattern may indicate a potential cyberattack (e.g., a denial-of-service attack) of a network resource.

Current domain monitoring approaches are unable to differentiate different types of URL traffic patterns. Consequently, current domain monitoring approaches are unable to process incoming URLs and accurately and efficiently determine which ones of them pose no threat and which ones should be sandboxed for further analyses.

Sandboxing is a technique in which an isolated test environment, i.e., a "sandbox," is used to scan (e.g., execute or test) a suspicious file or URL that is attached to, embedded in, or otherwise included in an electronic message (e.g., an email) coming into a computer network. Sandboxing allows a system such as an email processing system, a domain monitoring system, a threat protection system, and so on to safely observe what happens in a sandbox and take appropriate action.

However, sandboxing is computationally expensive and time consuming which, in turn, can cause a delay in email processing. Further, current solutions do not scale well and can only handle a small fraction of the email traffic.

What is needed, therefore, is a computer-implemented solution that can prioritize emerging URLs or URL components and determine which URLs with an accelerating velocity in the incoming email traffic should be analyzed in a sandboxed computing environment to thereby significantly reduce the number of URLs that must be reviewed and/or analyzed. Embodiments of an invention disclosed herein can address this need and more.

SUMMARY OF THE DISCLOSURE

A goal of the invention disclosed herein is to provide a computer-implemented solution that can programmatically significantly reduce the number of URLs for sandboxing. In embodiments disclosed herein, this goal can be realized in a system adapted for intelligently processing URLs into URL segments of various types, determining appropriate URL velocity tracking strategies, and applying acceleration algorithms accordingly to track the velocities of the URL segments and, based on an analysis on the acceleration of the tracked velocities, prioritize how the URLs are processed through a processing pipeline (e.g., sandboxing).

The system monitors hundreds of millions of domains and keeps track of URLs in, for instance, email traffic coming into an enterprise computing environment. A URL can be tracked in whole or in part. To track a URL as a whole, the system implementing the invention may parse the URL and attempt to identify and/or extract static or constant information known to the system (e.g., a document identifier, a user identifier, a port, a query parameter, a domain name, a local hostname, a path segment, etc.). The system can use the extracted information to determine a URL velocity tracking strategy that specifies how the URL is to be handled.

Alternatively or additionally, the system can decompose the URL according to its logical boundaries. For instance, a URL "http://en.example.com/test/resource.html" can have a transport protocol ("http" or HyperText Transfer Protocol, secure HTTP, file transfer protocol or FTP, etc.), a local host name ("en"), a domain host ("example.com"), and a path segment or component ("/test/resource.html") which can include a file name (e.g., "resource.html").

Some URLs can have one or more randomized URL segments or components. The system analyzes one or more of these URL segments, determines a corresponding appropriate traffic velocity acceleration model or strategy for each URL segment (e.g., using a slow counter or a fast counter in tracking the acceleration of the velocity of the respective URL segment), and applies the acceleration algorithms accordingly.

The output from the system becomes an attribute or factor that can be used to determine whether to apply URL sandboxing to the underlying URL. For instance, the system may compare the accelerated velocity of a URL segment with a threshold. If the accelerated velocity exceeds the threshold, the URL is deemed suspicious. The system may place the URL in a queue for sandboxing or provide the URL to a domain processing pipeline or a URL analyzer configured for analyzing the URL in a safe, sandboxed computing environment.

The invention can provide many advantages. For example, because the system can, based on the acceleration of velocities of various URL segments, programmatically differentiate various types of URLs (e.g., differentiating URLs with typical high volume traffic from URLs that are suddenly experiencing high volume traffic due to some kind of cyberattacks), the system can significantly reduce the number of URLs that otherwise would have been sandboxed.

As another example, the system is operable to identify and apply an appropriate URL velocity tracking strategy at the URL segment level. This enables the system to more accurately and efficiently identify a suspicious URL based on a portion thereof, even if the URL has a known domain or host name.

One embodiment may comprise a system having a processor and a memory and configured to implement a method disclosed herein. One embodiment may comprise a computer program product that comprises a non-transitory computer-readable storage medium storing computer instructions that are executable by a processor to perform the location threat monitoring method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As a non-limiting example, the invention disclosed herein can be implemented as part of an electronic mail processing system that processes electronic messages for a protected computer network. The electronic mail processing system is capable of making fast and intelligent decisions on whether to hold, block, allow, or sandbox an electronic message in view of potential threats such as viruses, phishing, spam, sender IP reputation, malware, or URL-based threats that may not appear to be suspicious to conventional email processing gateways, domain monitoring systems, and/or threat protection systems alike.

Figure 1:
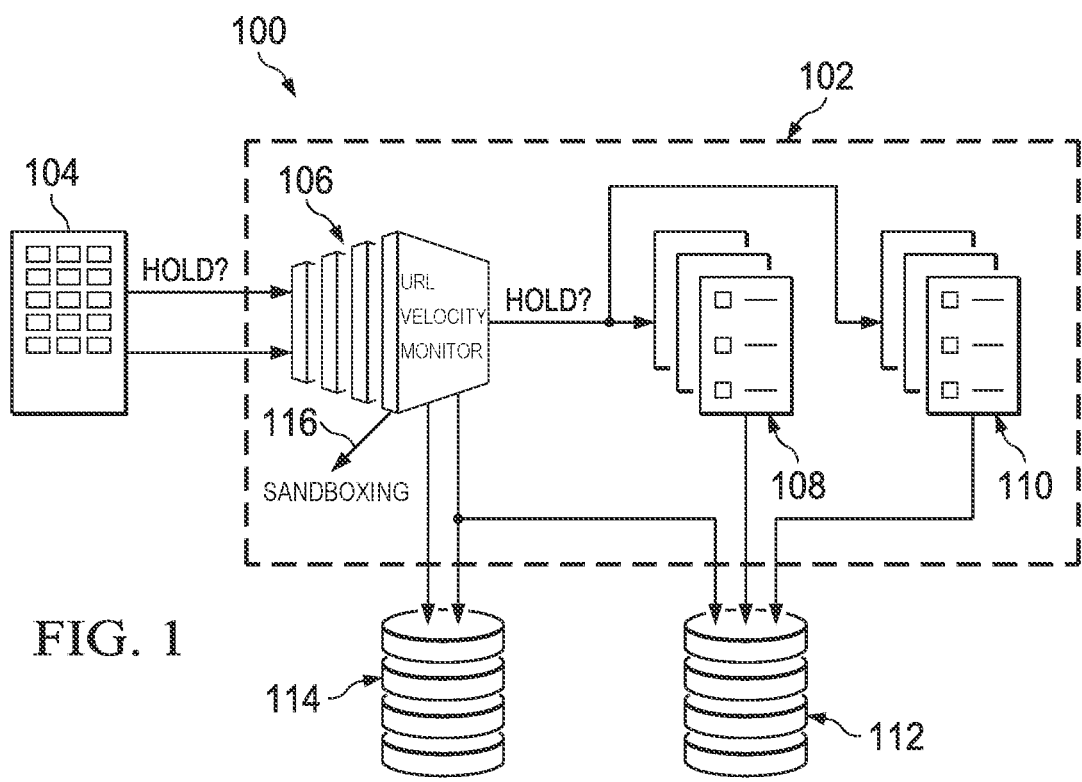
FIG. 1 depicts a diagrammatic representation of an electronic mail processing system having a mail gateway and a message-hold decision maker communicatively connected to a protected computer network.
Figure 2:
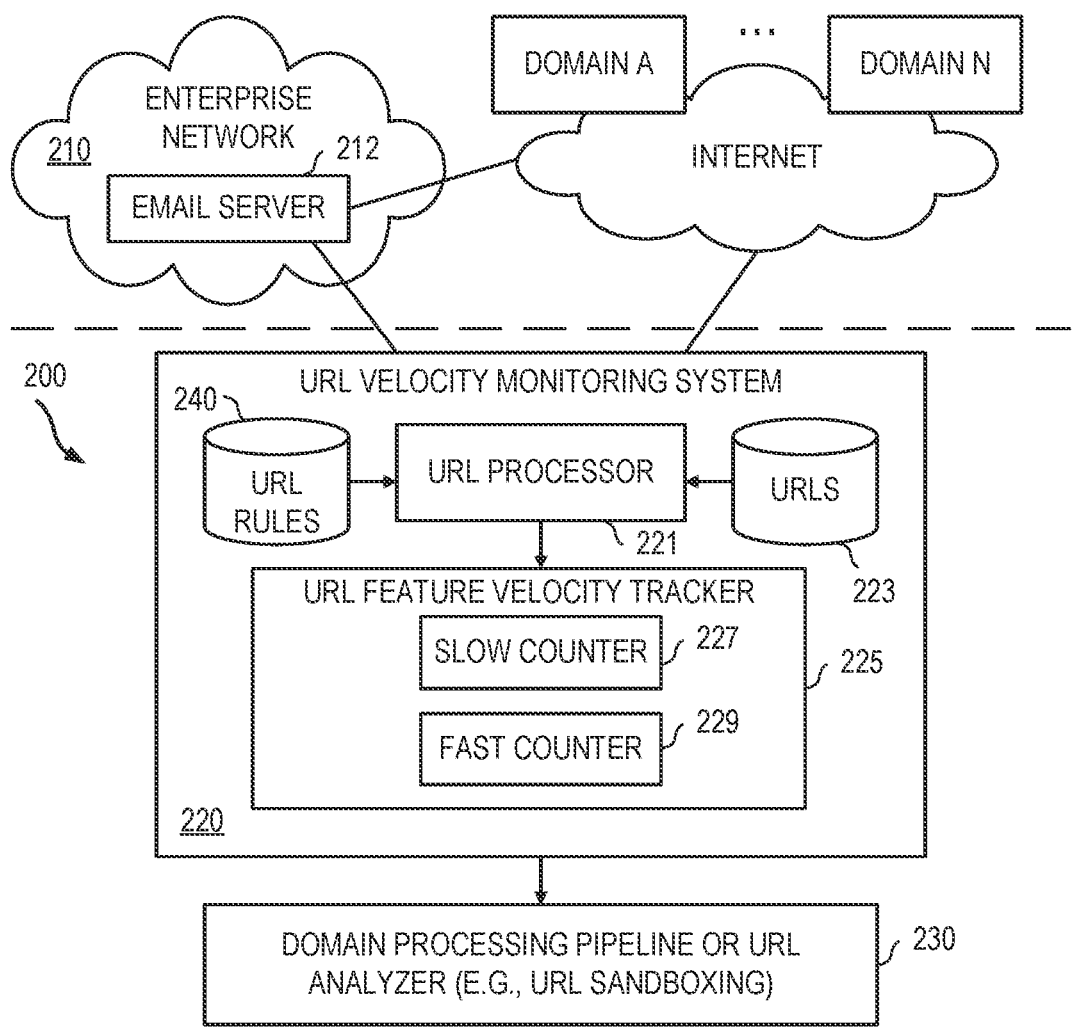
FIG. 2 depicts a diagrammatic representation of a URL velocity monitoring system operating in a network computing environment according to some embodiments.

FIG. 1 depicts a diagrammatic representation of an electronic mail processing system having a mail gateway (which is also referred to herein as a processing protection system (PPS)) and a message-hold decision maker (MHDM) operating over a protected computer network (e.g., the enterprise network 210 shown in FIG. 2). The mail gateway is operable to detect, based on published data, suspicious content (e.g., attachments, URLs, etc.) in a message. If nothing suspicious is found (e.g., due to no known malicious content identified in an attachment or URL in the message), the mail gateway makes an application programming interface (API) call to the MHDM with metadata that describes the message.

The MHDM, in near real-time, responds to the API call with a decision to hold, block, or allow the electronic mail message. In some examples, the decision can be to deliver or not deliver the electronic email message, then, if not delivered, a decision can be made to hold the electronic email message. For messages that are held, the MHDM will also make a decision whether or not to sandbox one or more URLs contained in each message. The methodology used by the MHDM to make a decision is described in detail below. The MHDM can reliably, efficiently, and intelligently provide the mail gateway with the near real time decision as to whether to hold a message or not, even if the message does not appear to be suspicious to other threat protection systems. In this way, the mail gateway is able to keep more URL-based threats out of the billons of messages that it processes every day and does so with a faster response time. The efficiency and effectiveness of the above-described solution, in turn, allows the processing capability of the mail gateway to scale when needed.

In response to receiving the decision from the MHDM, the gateway will either send the email to its intended recipient, block the email, or hold the email. If the decision is to hold the email, the gateway will place the email in a queue, and periodically ask the MHDM if it should continue holding the email, deliver the email, or block the email. A non-limiting example of an electronic message processing and threat protection system is illustrated in FIG. 1. In some embodiments, the "hold system" and "velocity tracking system" can be separate components that are connected. In some embodiments, they can be implemented as a single component. If implemented as separate components, the "hold system" issues an API call to the "velocity system" to both update the velocity and get the velocity of the URLs (or URI features/parts thereof). Accordingly, FIG. 1 is meant to be illustrative and non-limiting.

In the example of FIG. 1, an electronic mail processing system 100 operating over a protected computer network (not shown) may comprise an electronic mail processing gateway 104 and an MHDM system 102. The MHDM system 102 generally comprises a MHDM 106 and is supported by a pluggable framework of a plurality of classification engines, each of which is adapted for a particular function (e.g., threat detection, attack velocity evaluation, machine learning (ML), sandbox tracking, etc.). As is described in more detail below, the classification engines include a plurality of synchronous classifiers 108 and a plurality of asynchronous classifiers 110.

The synchronous classifiers 108 operate synchronous with the processing of email, and can return results to the MHDM 106 very quickly, and will have an immediate impact on decisions made by the MHDM 106 (described below) in response to the API calls. The synchronous classifiers 108 can be placed in a production mode as well as an audit mode, for testing purposes, for example.

The asynchronous classifiers 110 do not run synchronous with the processing of email, and therefore have less immediate impact on decisions made by the MHDM 106. Typically, asynchronous classifiers 110 are used for testing and sandboxing purposes, and will have an impact on future email traffic. In some embodiments, when data relating to an email message is sent to the synchronous classifiers 108, the same data is sent to the asynchronous classifiers 110. Although the asynchronous classifiers 110 may not generate results in time to be useful for that particular email message, the results of the asynchronous classifiers 110 are populated in the results cache 112 for use with respect to future email messages. As is described in more detail below, the MHDM 106 applies rules to results from the classification engines to make an accumulative decision to hold, block, allow, or sandbox the message.

FIG. 1 also shows a sandbox interface 116 that the MHDM 106 has with a plurality of sandboxes (not shown). The sandboxes could be implemented as a part of the MHDM system 102, or could be external to the MHDM system 102, as desired.

Results from both the synchronous classifiers 108 and asynchronous classifiers 110, past and present, as well as sandbox scan results, are stored in a results cache 112 for further analyses (e.g., audit, machine learning, etc.) and for adjustment of the pluggable framework. Also, as described below, other, external systems may also store data in the results cache 112. FIG. 1 also shows a request details cache 114 used to store details relating to requests originating from the gateway 104. Together, the caches 112 and 114 can help to determine when to end the hold time of an electronic mail message placed on hold (described below).

The invention disclosed herein is directed to prioritizing reviews of URLs for sandboxing so as to mitigate URL-based threats. In the example of FIG. 1, the invention can be realized in a URL velocity monitor that is part of the MHDM 106. Those skilled in the art appreciate that the invention can also be implemented in other ways, for instance, as a URL velocity monitoring system. The functionality of a URL velocity monitor or monitoring system will now be described.

FIG. 2 depicts a diagrammatic representation of a URL velocity monitoring system 220 operating in a network computing environment 200 according to some embodiments. As alluded to above, the URL velocity monitoring system 200 can be part of a bigger system (e.g., a domain protection system configured for protecting an enterprise computer network, an electronic message processing system, etc.).

The URL velocity monitoring system, collectively referred to hereinafter as the "system," can be communicatively connected to an email server (e.g., the email server 212, which is owned and operated by an enterprise customer of the system) and/or the Internet. In some cases, as part of message hold in an electronic message processing system (e.g., the MHDM 106 or the MHDM system 102 shown in FIG. 1), a goal is to prioritize emerging URLs or URL components for analysis. To achieve this goal, a fast way to judge URL is needed.

To address this need, in some embodiments, the system can provide, support, or implement a velocity service for a message hold decision maker. U.S. patent application Ser. No. 16/836,501, filed on Mar. 31, 2020, entitled "ELECTRONIC MESSAGE PROCESSING SYSTEMS AND METHODS," which is incorporated by reference herein, provides an example of an electronic message processing system with a message hold decision maker. The velocity service helps the message hold decision maker to decide whether to accept, reject, or throttle an email before the email is delivered.

As illustrated in FIG. 2, the enterprise computer network 210 can have an email server 212 configured for processing electronic messages in and out of the enterprise computer network 210. These electronic messages may contain URLs originated from various external domains (e.g., domain A . . . domain N) communicatively connected to the enterprise computer network 210 over the Internet.

As a non-limiting example, the system 220 may also be communicatively connected to external domains over the Internet. Accordingly, URLs may be received and/or obtained by the system from external domains through an enterprise computer network and/or the Internet. A URL processor 221 may process each URL as it comes into the system 220. Alternatively or additionally, the system 220 may store the URLs in a data store 223 and batch the URLs for processing by the URL processor 221 in bulk.

Figure 3:
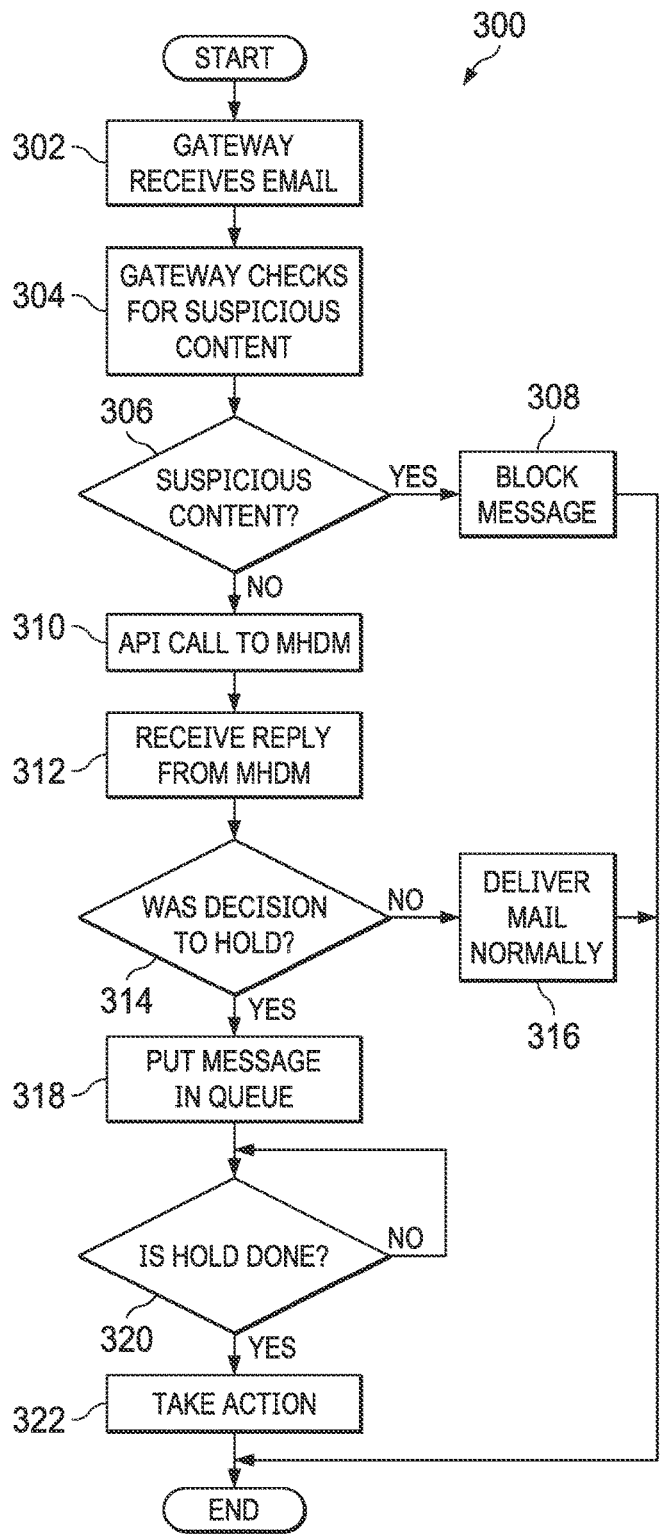
FIG. 3 is a flow diagram illustrating an example of a method of processing an incoming email message received by a mail gateway.

FIG. 3 is a flow diagram illustrating an example of a method 300 of processing an incoming email message received by a mail gateway (e.g., the mail gateway 104 shown in FIG. 1). Generally, a job of the mail gateway is to process incoming emails and distribute the emails to their intended recipients. However, since emails can contain malicious or harmful items (e.g., in an attached file, in an URL linking a malicious or harmful web site, etc.), another job of the mail gateway is to prevent malicious or harmful items from harming devices on the protected network.

When the mail gateway receives an email (302), the mail gateway checks the email for suspicious content (304). In some embodiments, the mail gateway is adapted to detect, based on published data, suspicious content (e.g., content related to viruses, phishing, spam, sender IP reputation, malware, URL-based threats etc.) in a message. As an example, the mail gateway may run virus scans on received emails. In another example, the mail gateway can compare a URL in the email with known harmful URLs. In other words, the mail gateway can use standard email traffic risk prevention measures in an attempt to detect suspicious content. If the mail gateway finds something suspicious (306) (e.g., a positive virus scan, a known harmful URL, etc.), the mail gateway may block the email (308), to prevent the email from harming the computing device of the intended recipient. In this scenario, the lifecycle of the email is complete.

If the mail gateway does not find anything suspicious (306) (e.g., due to no known malicious content in an attachment or URL), the mail gateway makes an API call, including metadata that describes the email, to a MHDM (e.g., the MHDM 106) (310). In near real-time, the MHDM will reply (312) to the mail gateway with a decision on how to handle the email. The process for determining that decision, by the MHDM 106, is described in detail below.

If the decision (314), as determined by the MHDM, is not to hold the email, the mail gateway will deliver the email normally to its intended recipient (316). If the decision (314), as determined by the MHDM, is to hold the email, the mail gateway will hold the email by placing the email in a queue (318) (e.g., for 5 to 10 minutes).

Thereafter, the mail gateway will periodically check (320) the hold status (e.g., every 30 seconds). Once the mail gateway receives an indication that the hold is done (described below), the mail gateway will take an action (322). As a non-limiting example, the contents of a results cache (e.g., the results cache 112) and a request details cache (e.g., the request details cache 114) can indicate whether a hold applies. The action taken depends on the results of the classifiers and/or sandbox(es), but could include sending the email, blocking the email, etc.

Figure 4:
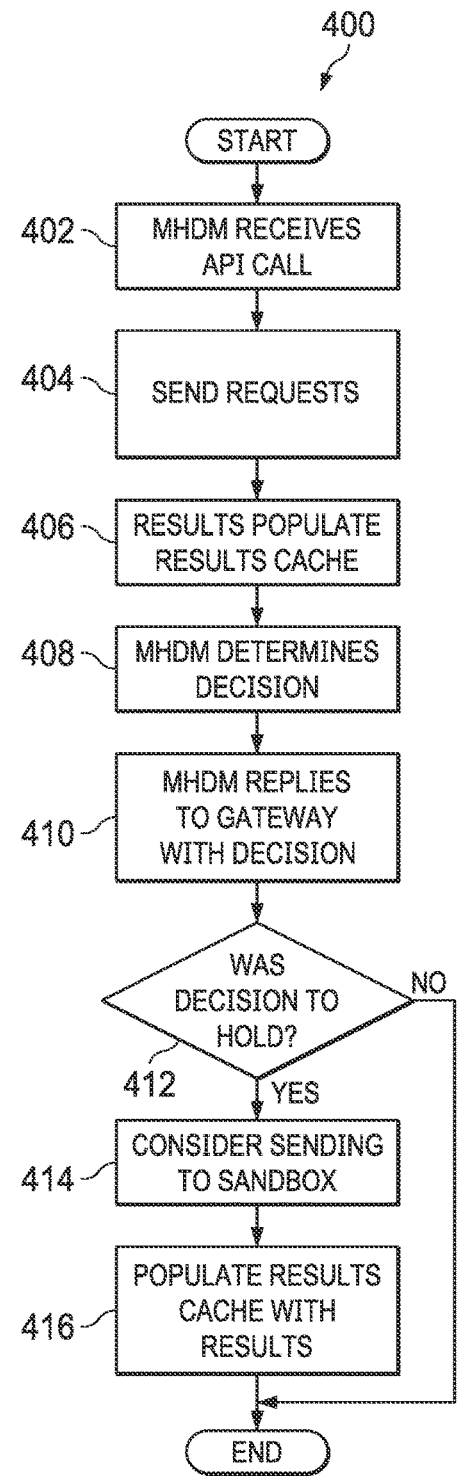
FIG. 4 is a flow diagram illustrating an example of an operation of a message-hold decision maker in processing an incoming electronic message received by the mail gateway.

FIG. 4 is a flow diagram illustrating an example of an operation 400 of the MHDM during the automatic processing of an incoming electronic message received by the mail gateway. The mail gateway may receive an email and make an API call to the MHDM. When the MHDM receives the API call (402), the MHDM sends requests to one or more of the synchronous classifiers and/or a URL velocity monitoring system (404).

For example, referring to FIG. 1, the MHDM 106 may send requests to the classifiers 108 and 110 that are most relevant to the particular email. If the email does not have an attachment, but has a URL, the MHDM 106 may send the URL to the URL velocity monitor (if the URL velocity monitor is integrated with the MHDM 106) or to the URL velocity monitoring system. If the email has an attachment and a URL, the MHDM 106 may select classifiers 108/110 that are adapted for processing the attachment (e.g., detecting harmful URLs, virus detection, phishing detection, spam detection, etc.) and send the URL to the URL velocity monitor or monitoring system. In other embodiments, the MHDM 106 could send requests to all of the classifiers 108/110, and sort through all of the results as they populate the results cache 112.

As the synchronous classifiers 108 generate their results, the generated results will populate the results cache 112 (406). The MHDM 106 then determines a decision (408), based on the results of the synchronous classifiers 108 (and possibly on previous results stored in the results cache 112).

As a non-limiting example, the MHDM 106 can apply rules to the synchronous classifier results. In some embodiments, the MHDM 106 can generate a score based on the application of the rules, and then based on the score, determine a decision.

The MHDM 106 can be configured to determine a decision in any desired manner, as one skilled in the art would understand. Non-limiting examples of possible decisions include holding a message, blocking the message, allowing the message, sandboxing the message, etc. After a decision is determined (408), the MHDM 106 replies to the mail gateway 104 with the decision (410). The reply to the API call occurs in near real-time.

If the determined decision was to hold the email (412), the MHDM 106 may consider analyzing the URLs from an email in an isolated test environment, such as by sending URLs in the email to a sandbox (414). Generally, a sandbox is a security mechanism for separating running programs, in an effort to mitigate system failures or software vulnerabilities from spreading, as one skilled in the art understands. In some embodiments, a sandbox can be implemented in a virtual machine that emulates a host computer. The virtual machine can be configured to only allow access to predefined resources through the emulator. By observing the sandbox, it can be determined whether the content, URL, etc. suspected of being harmful is actually harmful. As with the classifier results, sandbox results populate the results cache 112 (416).

Harmful URLs may be originated from domains used by threat actors to conduct email campaigns and/or distribute emails for questionable purposes. Frequently, threat actors abuse legitimate domains for illegitimate purposes (e.g., hosted services, Sharepoint, etc.). A goal of the invention disclosed herein is to identify all of them: domains/hosts/URLs owned by threat actors, as well as URLs on legitimate sites controlled by threat actors. Unfortunately, current domain monitoring approaches are unable to differentiate domains from which a high volume of URLs are originated for legitimate purposes (e.g., a large amount of URLs may be contained in search results provided by a popular online search site) from suspicious domains from which a high volume of URLs are originated for illegitimate purposes (e.g., phishing links pointing to active content or malware). That is, examining domains based on the respective volumes of URLs in the network traffic at a particular point in time is insufficient to deterministically identify domains of interest for further analysis in a sandbox.

The inability to differentiate good domains/URLs from bad domains/URLs poses a significant challenge to protect computer networks. A prior approach is to review and analyze each URL coming into a protected computer network (e.g., enterprise computer network 212) through an email server, prior to reaching a recipient's inbox, perhaps in a safe, sandboxed environment that is separate from the recipient's computing environment in which the URL would have otherwise run. However, this approach is inefficient and practically impossible because there can be billions and tens of billions of URLs that need to be sandboxed on a daily basis and sandboxing can be computationally intensive and slow.

Figure 5:
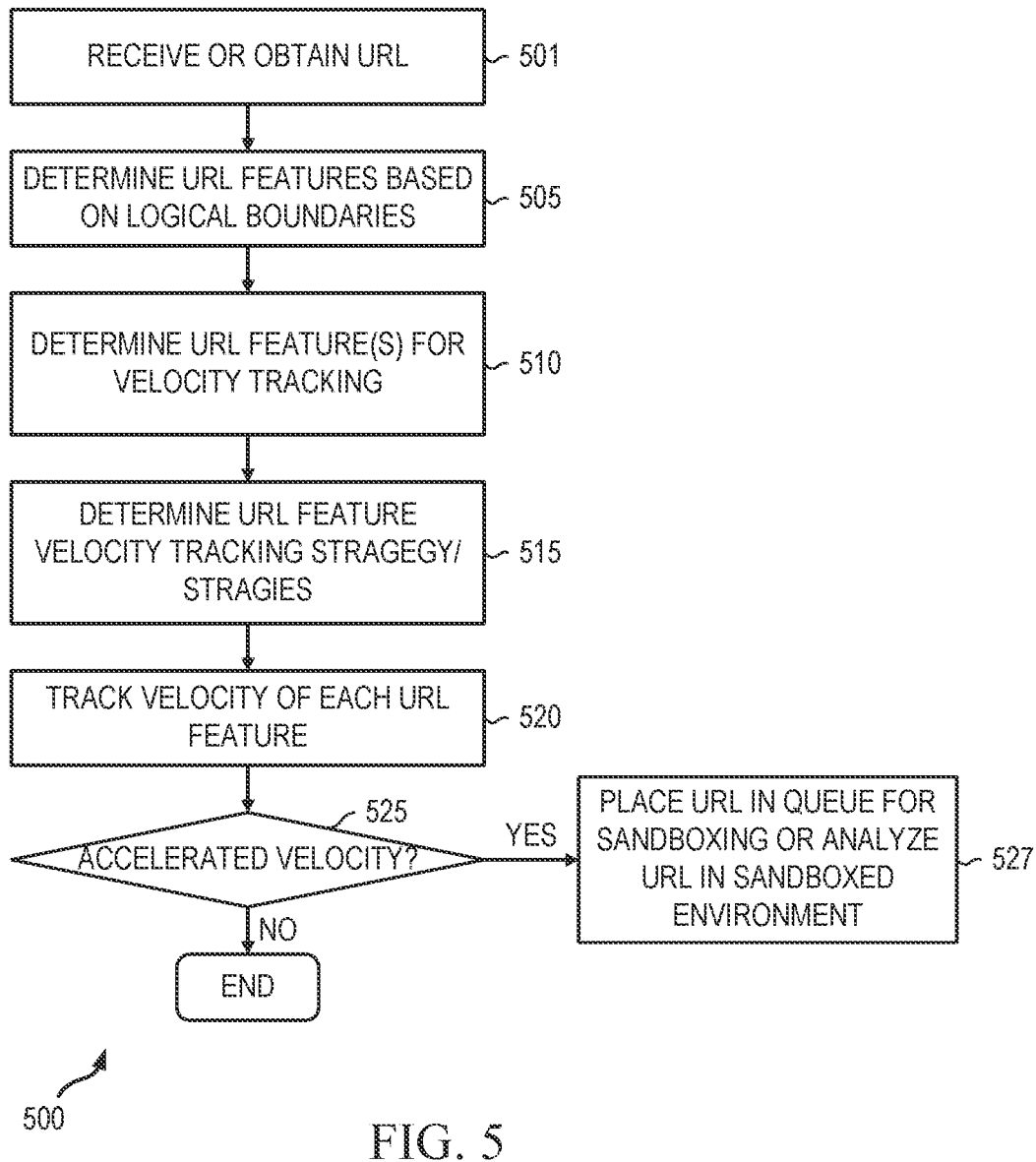
FIG. 5 is a flow chart that illustrates an example of a method for the URL processor to prioritize reviews of URLs for sandboxing based on accelerated velocities of URL features in the network traffic.

To this end, the invention disclosed herein leverages URL segmentation so that different parts, components, segments, or features of a URL (collectively referred to herein as "URL features") can be used for monitoring purposes and determining whether the URL is a candidate for sandboxing. Referring to FIG. 2, URL segmentation is performed by the URL processor 221. FIG. 5 is a flow chart that illustrates an example of a method 500 for the URL processor to prioritize reviews of URLs for sandboxing based on accelerated velocities of URL features in the network traffic.

The URL processor may receive or obtain a URL (501). The URL may be contained in an email received by an email server operating in an enterprise computer network or a data store (e.g., data store 223) internal to the system (501). The URL processor is configured for parsing the URL into features (or components) based on the logical boundaries of the URL (505). In some embodiments, each URL component is monitored for volume in a time window and acceleration (i.e., change in velocity/time). A single email may have thousands of components that need to be tracked.

A URL contains a string of human-readable text designed to replace the numerical value of an Internet Protocol (IP) address that computers use to communicate with servers. Unlike the IP address, which is highly structured, the length of a URL is arbitrary and unlimited. The text string of a URL consists of a protocol, a domain name, and a path (which includes a specific subfolder or directory where a page is located). The basic format of a URL according to the Web standard can be of the form: "protocol://domain-name.top-level-domain/path" or, as a non-limiting example, "http://en.example.com/test/resource.html." The invention can efficiently process URL fragments, features, or components in memory, even though URL features can be larger than an IP address.

In the latter example, the URL has a local host name ("en") and a domain host ("example.com") and the path includes a file name (e.g., "resource.html"). Generally, if a domain name is completely specified, including a top-level domain of the Internet, then the hostname is referred to as a fully qualified domain name (FQDN). For instance, a URL "http://www.example.com/index.html" indicates a protocol "http," a hostname "www.example.com," and a file name "index.html." In some cases, a URL can include a functional element, e.g., a query parameter for accessing a database, a regular expression that describes a search pattern, etc.

To this end, the logical boundaries generally refer to a way to decompose a URL into URL segments or components. The logical boundaries may be configurable. In some embodiments, the logical boundaries can follow the Web standard (e.g., protocol, domain, hostname, path, query parameter, etc.). In some embodiments, the logical boundaries can be customized. For instance, a logical boundary can be defined by n-gram or a length of characters (e.g., a URL segment consists of a set of three characters, such as "abc," "nbc," "cnn," "zoo," etc.).

In some embodiments, URLs are parsed into components (features). Examples of URL components include, but are not limited to, domain, hostname, full URL, DROPBOX share ID, SHAREPOINT document ID, etc. Also, numeric values are mapped to human-friendly labels based on empirical evaluation. For instance, acceleration could be increasing, steady, or decreasing; velocity could be slow, intermediate, or fast; and volume could be low, medium, or high. These labels facilitate subject matter experts in writing URL rules (e.g., the URL rules 240) used by the rules engine (e.g., the URL processor 221) to process URLs. These URL attributes—acceleration, volume, velocity—with their respective labels can be expressed as access-control entries (ACES) attributes (e.g., "msg-url-host-acceleration-increasing") which can be stored in an access-control list (ACL). In computer security, an ACL refers to a data structure (e.g., a table) storing permissions associated with a system resource. Network security analysts can write rules against these ACES attributes (e.g., a message that contains a URL bursting in velocity in a time window) and specify a corresponding action (e.g., delay, sandboxing, etc.).

In some embodiments, the URL processor 221 is configured for determining which URL feature or features are subject for URL velocity tracking (210). For instance, the URL processor 221 may determine to track the velocity of the domain name or the path.

In some embodiments, tracking can be handled by a URL feature velocity tracker for their respective velocity/acceleration. As described below, the URL feature velocity tracker monitors a component for its velocity/acceleration, for instance, its volume in a time window and acceleration (i.e., change in velocity/time). Generally, components constantly appear at high volumes are not interesting for sandboxing purposes because they likely are originated from legitimate domains such as GOOGLE.com. On the contrary, components that suddenly show up at high volumes are suspicious because such a change in behavior is a tell-tale sign of an email campaign.

In some embodiments, the URL processor is configured for determining an appropriate URL velocity tracking model or strategy by accessing a knowledgebase or rule set that contains rules and/or information on how to handle the URL feature or features of interest (215). For instance, some domains may provide URLs in a structured format that contains a document identifier, a share identifier, etc. Some domains may randomize a portion of a URL. Some domains may assign a random identifier to every document.

Referring to FIG. 1, in some embodiments, the URL processor 221 utilizes a URL feature velocity tracker 225 for tracking each URL feature of interest. The URL feature velocity tracker 225 is configured for determining how fast and how often the URL feature of interest appears in the network traffic (220). The URL feature velocity tracker 225 may include a slow counter 227 and a fast counter 229 and may implement a counting algorithm for counting the frequency of the URL feature of interest showing up in a rolling time window using the slow counter 227 or the fast counter 229.

An example of a suitable counting algorithm can implement an IP reputation service/component called Proofpoint Dynamic Reputation (PDR). When used for tracking URL features of interest (e.g., expressed as ACES attributes), the algorithm is used after message SMTP acceptance and before message mailbox delivery. The per-item memory requirement for URL feature tracking is twice the amount used for SMTP processing. Since an email can have many URLs, and a URL usually has many tracked components with attacker-controlled size (domain, host, path, etc.) requirements can be substantially higher. To save storage space, each URL component can be hashed and then stored in the hashed form. Further, to keep the memory usage under control, URL features that do not appear "recently" enough (e.g., within a time period inclusive of the day of processing) are purged or aged out.

To purge or age out URL features, a time decay function may be used. A time decay function takes some information about a URL feature and returns a weight representing the importance of the URL feature relative to time. That is, this weight can be written as a function of the age of the URL feature of interest. The age of a URL feature can be measured, using timestamps, backward from the current time. Examples of suitable time decay functions can be found in "Cormode G., et al. *Forward Decay: A Practical Time Decay Model for Streaming Systems*. ICDE 2009: 138-149," which is incorporated by reference herein.

In some embodiments, the counting algorithm is tuned to be sensitive to changes—how often (frequency) a URL feature of interest shows up in a rolling time window. For instance, suppose the URL feature of interest is the domains in the URLs. For each domain, two types of velocities are tracked over time, one using the slow counter and one using the fast counter. For example, suppose a URL usually comes from a domain every 5 seconds and suddenly 1000 URLs come from the domain in one second. This change can be an indication that the domain is appearing in a high velocity and seems to be increasing in volume (accelerating in volume) over time, in a recent time period. This change can affect the decision as to whether to review the URL for sandboxing. As a non-limiting example, a threshold can be defined to facilitate this decision. In this case, the change or acceleration rate is 1000%, significant enough for the system to advise a review of the URL. This threshold can be tunable and may vary from implementation to implementation, depending upon a desired level of reduction in URLs for review.

One way to determine the threshold is by analyzing data from tracking a URL feature of interest. For instance, the acceleration rate for the velocity of the URL feature of interest may go up or down over time. The data points thus tracked over time can be utilized (e.g., plotted) to determine a meaningful threshold which performs better than random sampling and which captures newly emerged attacks. The threshold can be a fixed value that is evaluated every six months or some predetermined time interval.

The slow counter will behave one way and the fast counter will behave another way in a rolling window. Essentially, the slow counter is less sensitive to changes and the fast counter is more sensitive to changes. For instance, after a spike in traffic, the spike eventually goes back down. The slow counter will very slowly also go back down, while the fast counter will go back down very quickly. Plotting the raw counts for the slow counter and the fast counter can provide an insight in how they interact. Applying the slow and fast counter values relative to each other shows how things speed up or slow down over time. That is, if a domain always provides URLs at a high volume, the slow and fast counters behave the same or similar way. Therefore, when they interact, they cancel each other out. Conversely, if a domain does not always provide URLs at a high volume, the slow and fast counters behave differently. Therefore, when they interact, they do not cancel each other out.

Referring to FIG. 5, as a non-limiting example, suppose a domain (which is an example of a URL feature) being tracked has a slow counter that measures 100 URLs in a rolling window of five minutes and a fast counter that measures 100 URLs in a rolling window of one minute. In this case, the slow counter and the fast counter behave the same and they cancel out each other (100-100=0). This domain is not experiencing an acceleration of velocity of URLs and, therefore, is not an ideal candidate for sandboxing (525).

In embodiments disclosed herein, a URL is decomposed into URL features. Different parts (URL features) of the URL are tracked in terms of velocity. Different attacks will have different parts randomized and different parts constant. For instance, for a campaign that does not randomize the domain, the system can detect that URLs from the domain are suddenly increasing. For a campaign that randomizes the domain, tracking the domain will not be sufficient to capture the increased/accelerated velocity of URLs from the domain. Tracking URL features provides the system with the additional ability to analyze different types of attacks directed to different parts of a URL.

More specifically, there are different common attacker behaviors. At the domain level, sometimes a bad actor may purchase a domain and send URLs from that domain. In this case, blocking the domain is sufficient. However, another bad actor may purchase multiple domains and may use all of the domains at once or change a domain every minute such that the attacks evolve over time. In such a case, the attacks are randomized and blocking the domain will not suffice. Since purchasing multiple domains can get expensive, an attacker may try to randomize the path or some other URL features. In some cases, it is not possible or practical to block the domain (e.g., because users in the enterprise computer network have to have access to the domain, because the domain is hosted publicly, etc.). As discussed above, threat actors often abuse legitimate domains for illegitimate purposes. A goal of the invention disclosed herein is to identify domains/hosts/URLs owned by threat actors as well as URLs on legitimate sites controlled by threat actors. To this end, the URL processor can be adapted for recognizing randomized part(s) versus static or constant part(s) of a URL. For example, the URL processor can be adapted for recognizing "public.org/docs" as a static part of a URL and the rest of the URL, which may represent a subdirectory and/or may contain a document identifier, a user name, a tenant identifier, etc., as a randomized part of the URL. The subdirectory may be controlled by an attacker, even though the domain is hosted by a public site.

Some embodiments may be configured for tracking URL features that represent places that provide high volume data, for instance, sites that host user-supplied data such as document sharing and/or collaboration sites. Because the traffic pattern is different from site to site, different thresholds can be utilized for determining whether acceleration in the velocities of the URL features is significant enough for a URL review and/or sandboxing (527).

The number of unique URLs per day can be significantly larger than the total number of domains on the Internet. The opportunity for randomization is much bigger for URLs. Thus, the scale is very different in terms of unique URLs per day versus IP addresses (each of which consists of a 32-bit numerical value). Further, for bad actors and potential bad actors alike, it is easier to control URLs than to control IP addresses. Thus, the scale of ways for potential abuse of URLs is much larger than that of IP addresses. To this end, and recognizing different strategies for a bad actor to randomize URLs and/or use URLs for cyberattacks, different defense mechanisms (in three or four broad categories) can be defined to handle different types of attacks. The system can determine which part of a URL is randomized and access a rule or a set of rules that describes how to handle such a URL. In this way, the system can adapt to different types of URLs with varying behaviors.

Figure 6:
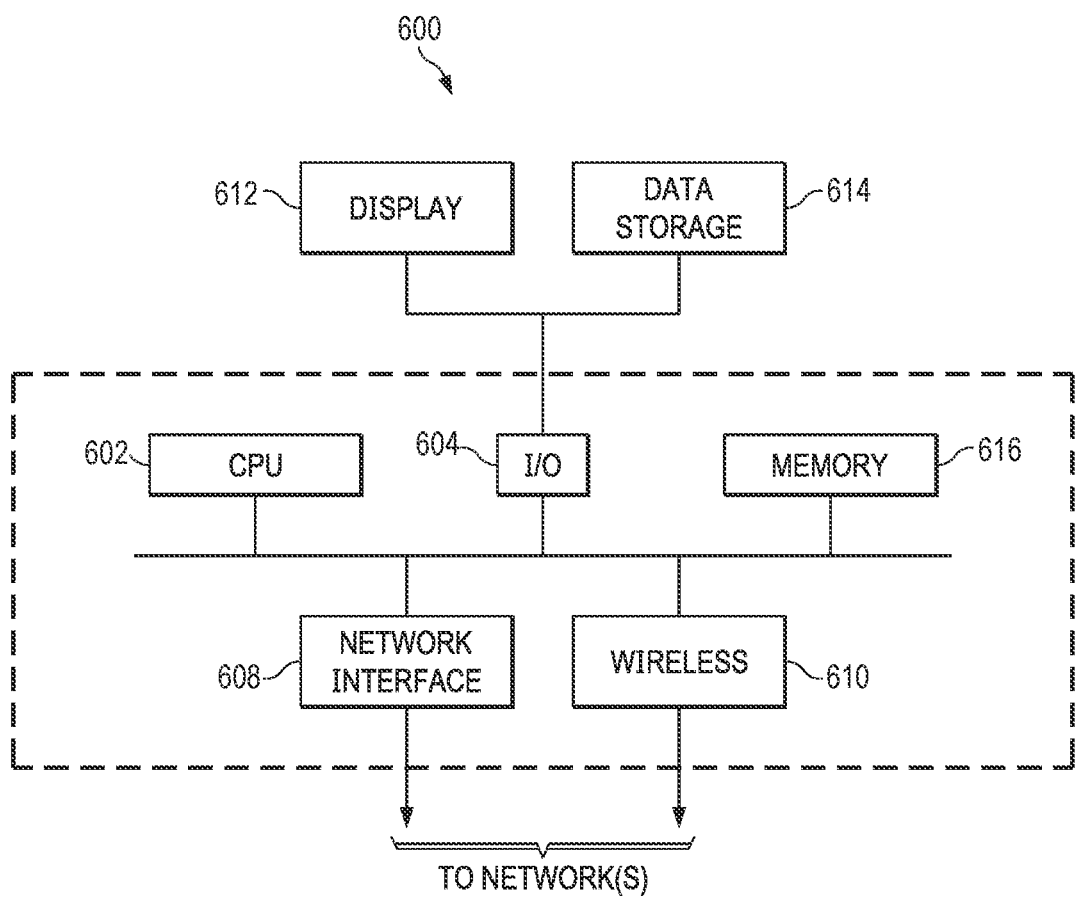
FIG. 6 depicts a diagrammatic representation of a data processing system for an electronic mail processing system according to some embodiments disclosed herein.

FIG. 6 depicts a diagrammatic representation of a data processing system for processing electronic messages for a protected computer network. As illustrated in FIG. 6, a suitable data processing system 600 can include one or more central processing units (CPU) or processors 601 coupled to one or more user input/output (I/O) devices 602 and memory devices 603. Examples of I/O devices 602 may include, but are not limited to, keyboards, displays, monitors, touch screens, printers, electronic pointing devices such as mice, trackballs, styluses, touch pads, or the like. Examples of memory devices 603 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 600 can be coupled to display 606, information device 607 and various peripheral devices (not shown), such as printers, plotters, speakers, etc. through I/O devices 602. Data processing system 600 may also be coupled to external computers or other devices through network interface 604, wireless transceiver 605, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can be executed on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
   processing, by a computer, universal resource locators (URLs) into URL segments;
   determining, by the computer, URL features from the URL segments;
   determining, by the computer, a traffic velocity acceleration model for each respective URL feature of the URL features;
   tracking, by the computer, velocities of the URL features in email traffic coming into an enterprise computing environment within a time period, wherein the tracking comprises applying traffic velocity acceleration models, each traffic velocity acceleration model corresponding to the respective URL feature of the URL features;
   analyzing, by the computer, acceleration of the velocities of the URL features;
   based on a result from the analyzing, prioritizing, by the computer, how the URLs are processed through a processing pipeline;
   applying a time decay function to the URL features, wherein application of the time decay function to a URL feature produces a weight that represents an importance of the URL feature relative to time; and wherein age of the URL can be measured using timestamps corresponding to backward from the current time; and
   purging the URL features utilizing the weight.

2. The method according to claim 1, wherein determining the traffic velocity acceleration model comprises accessing a knowledgebase or rule set that contains information, a rule, or a combination thereof that specifies how to handle the respective URL feature.

3. The method according to claim 1, further comprising:
   determining whether to hold, block, or allow an email coming into the enterprise computing environment based at least in part on whether a segment of the URL has an accelerated traffic velocity that exceeds a threshold.

4. The method according to claim 1, further comprising:
   determining which portion of a URL is randomized;
   accessing a rule or a set of rules that describes how to handle the URL with a randomized portion;
   determining a traffic velocity acceleration model for the URL;
   applying the traffic velocity acceleration model so as to determine an acceleration of a traffic velocity of the URL in the email traffic;
   determining whether the acceleration of the traffic velocity exceeds a threshold; and
   responsive to the acceleration of the traffic velocity exceeding the threshold, placing the URL in a sandboxed computing environment or in a queue for sandboxing.

5. The method according to claim 1, wherein the processing further comprises determining static components and randomized components of the URLs and wherein the URL segments comprise a randomized URL segment.

6. The method according to claim 1, wherein the URLs are processed into the URL segments based on boundaries embedded in the URLs.

7. A system, comprising:
a processor;
a non-transitory computer-readable medium; and
instructions stored on the non-transitory computer-readable medium and translatable by the processor for:
processing universal resource locators (URLs) into URL segments;
determining URL features from the URL segments;
determining a traffic velocity acceleration model for each respective URL feature of the URL features;
tracking velocities of the URL features in email traffic coming into an enterprise computing environment within a time period, wherein the tracking comprises applying traffic velocity acceleration models, each traffic velocity acceleration model corresponding to the respective URL feature of the URL features;
analyzing acceleration of the velocities of the URL features;
based on a result from the analyzing, prioritizing how the URLs are processed through a processing pipeline;
applying a time decay function to the URL features, wherein application of the time decay function to a URL feature produces a weight that represents an importance of the URL feature relative to time; and wherein age of the URL can be measured using timestamps corresponding to backward from the current time; and
purging the URL features utilizing the weight.

8. The system of claim 7, wherein determining the traffic velocity acceleration model comprises accessing a knowledgebase or rule set that contains information, a rule, or a combination thereof that specifies how to handle the respective URL feature.

9. The system of claim 7, wherein the instructions are further translatable by the processor for:
determining whether to hold, block, or allow an email coming into the enterprise computing environment based at least in part on whether a segment of the URL has an accelerated traffic velocity that exceeds a threshold.

10. The system of claim 7, wherein the instructions are further translatable by the processor for:
determining which portion of a URL is randomized;
accessing a rule or a set of rules that describes how to handle the URL with a randomized portion;
determining a traffic velocity acceleration model for the URL;
applying the traffic velocity acceleration model so as to determine an acceleration of a traffic velocity of the URL in the email traffic;
determining whether the acceleration of the traffic velocity exceeds a threshold; and
responsive to the acceleration of the traffic velocity exceeding the threshold, placing the URL in a sandboxed computing environment or in a queue for sandboxing.

11. The system of claim 7, wherein the processing further comprises determining static components and randomized components of the URLs and wherein the URL segments comprise a randomized URL segment.

12. The system of claim 7, wherein the URLs are processed into the URL segments based on boundaries embedded in the URLs.

13. A computer program product comprising a non-transitory computer-readable medium storing instructions translatable by a processor for:
processing universal resource locators (URLs) into URL segments;
determining URL features from the URL segments;
determining a traffic velocity acceleration model for each respective URL feature of the URL features;
tracking velocities of the URL features in email traffic coming into an enterprise computing environment within a time period, wherein the tracking comprises applying traffic velocity acceleration models, each traffic velocity acceleration model corresponding to the respective URL feature of the URL features;
analyzing acceleration of the velocities of the URL features;
based on a result from the analyzing, prioritizing how the URLs are processed through a processing pipeline;
applying a time decay function to the URL features, wherein application of the time decay function to a URL feature produces a weight that represents an importance of the URL feature relative to time; and wherein age of the URL can be measured using timestamps corresponding to backward from the current time; and
purging the URL features utilizing the weight.

14. The computer program product of claim 13, wherein determining the traffic velocity acceleration model comprises accessing a knowledgebase or rule set that contains information, a rule, or a combination thereof that specifies how to handle the respective URL feature.

15. The computer program product of claim 13, wherein the instructions are further translatable by the processor for:
determining whether to hold, block, or allow an email coming into the enterprise computing environment based at least in part on whether a segment of the URL has an accelerated traffic velocity that exceeds a threshold.

16. The computer program product of claim 13, wherein the instructions are further translatable by the processor for:
determining which portion of a URL is randomized;
accessing a rule or a set of rules that describes how to handle the URL with a randomized portion;
determining a traffic velocity acceleration model for the URL;
applying the traffic velocity acceleration model so as to determine an acceleration of a traffic velocity of the URL in the email traffic;
determining whether the acceleration of the traffic velocity exceeds a threshold; and
responsive to the acceleration of the traffic velocity exceeding the threshold, placing the URL in a sandboxed computing environment or in a queue for sandboxing.

17. The computer program product of claim 13, wherein the processing further comprises determining static components and randomized components of the URLs and wherein the URL segments comprise a randomized URL segment.

* * * * *